United States Patent [19]
Reid et al.

[11] Patent Number: 5,695,258
[45] Date of Patent: *Dec. 9, 1997

[54] RAILWAY MANUAL BRAKE CONTROL VALVE TEST UNIT

[75] Inventors: Jeffrey D. Reid, St. Catharines, Canada; Edward W. Gaughan, Irwin, Pa.

[73] Assignee: Westinghouse Air Brake Co., Wilmerding, Pa.

[*] Notice: The term of this patent shall not extend beyond the expiration date of Pat. No. 5,509,727.

[21] Appl. No.: 598,117

[22] Filed: Feb. 7, 1996

Related U.S. Application Data

[63] Continuation-in-part of Ser. No. 396,815, Mar. 2, 1995, Pat. No. 5,509,727, which is a continuation-in-part of Ser. No. 306,790, Sep. 15, 1994, Pat. No. 5,480,218.

[51] Int. Cl.$^6$ ............................................. B60T 11/34
[52] U.S. Cl. ............................ 303/3; 303/28; 303/60; 303/82
[58] Field of Search .................................. 303/3, 15, 28, 303/20, 82, 40, 57, 66, 59, 60, 35

[56] References Cited

U.S. PATENT DOCUMENTS 5,509,727  4/1996  Hart et al. ................................ 303/3

*Primary Examiner*—Matthew C. Graham
*Attorney, Agent, or Firm*—Gary J. Falce

[57] ABSTRACT

A portable, single-car test unit for a railway freight brake control valve for manually executing pressure manipulations to evaluate the operating conditions of the control valve. The pipe bracket portion is connected to a brake pipe, an auxiliary reservoir, an emergency reservoir, a brake cylinder retaining valve and a brake cylinder each being connected to a respective fluid passageway. The test unit accesses the fluid passageways at access ports, respectively connected to each passageway. Valves are utilized in the test unit to manipulate the pressure in the fluid passageways and pressure gauges measure fluid pressure in the passageways. An operator records each pressure measurement and calculates and stores the differences between selected pairs of the pressure measurements as well as elapsed time data for the measurements.

15 Claims, 5 Drawing Sheets

RAILWAY MANUAL BRAKE CONTROL VALVE TEST UNIT

RELATED APPLICATION

This application is a continuation-in-part of application Ser. No. 08/396,815, filed Mar. 2, 1995, now U.S. Pat. No. 5,509,727 which is a continuation-in-part of Ser. No. 08/306,790, filed Sep. 15, 1994 now U.S. Pat. No. 5,480,218.

BACKGROUND OF THE INVENTION

1. Field of the Invention

This invention relates generally to brake control valve devices for railway cars and more particularly to means adapted to such brake control valve devices for directly accessing fluid lines and conducting a series of evaluative pressure manipulations thereof.

2. Description of the Prior Art

Typical freight control valves such as the ABD, ABDW, DB-60 and ABDX control valves, are comprised of a pipe bracket portion having a service portion and an emergency portion mounted on opposite sides or faces of the pipe bracket. Such a typical control valve assembly is shown in prior art diagrammatic FIG. 1. Typically, a third side, the rear, of the pipe bracket portion has a number of connections for connecting the pipe bracket portion to piping of the freight car. These connections typically include connections to the brake pipe, the brake cylinder retaining valve, the brake cylinder, the emergency reservoir and the auxiliary reservoir. The connections to the brake pipe, the brake cylinder retaining valve, the brake cylinder, the emergency reservoir and the auxiliary reservoir are each respectively connected to a fluid passageway within the pipe bracket portion. The pipe bracket passageways connected to these pneumatic pipes permits the pipe bracket to provide the necessary communication of pressures to both the service and emergency valve portions.

Currently, when it is desired to test a freight brake control valve, the prior art testing device is attached at one end directly to the brake pipe and at an opposite end to a pressurized air source, such as a compressor. By rotating a rotary valve through various positions, brake operation is simulated. For example, while charging the brake pipe line with the pressurized air source, the rotary valve may be positioned so that the pressurized air must travel through a relatively narrow orifice, thus representing slow charging. The rotary valve could also be rotated so that the pressurized air flows through a wider orifice, thus representing quick charging. A lap position of the rotary valve may also be selected in which there is no orifice, thus sealing the brake pipe so that the brake pipe may be tested for leakage. The rotary valve may also be indexed through several application settings in which air is allowed to leave the brake pipe through varying sized passages, thus representing various degrees of brake application.

The prior art testing device is equipped with a pressure gauge and a flowmeter. The prior art testing device thus enabled several testing options, which included visually watching the brake cylinder for operation, timing the various brake applications manually (i.e., through a stop watch) and detecting leakage by monitoring the flowmeter.

Prior art tests accessed only one channel, the brake pipe channel in which brake pipe pressure is manipulated and the response to the control valve is monitored. In the prior art, the pressures in remaining channels are unknown.

Thus, it would be advantageous to provide a testing device which can perform enhanced testing functions by directly accessing pressures of channels in addition to solely the brake pipe, such as one or more of the brake cylinder, the emergency reservoir and the auxiliary reservoir.

SUMMARY OF THE INVENTION

The invention provides a portable, manually-controlled single-car test unit for a railway freight brake control valve. The testing device operates by directly accessing the pressures of a number of channels of the control valve. The test unit enables an operator to execute a predetermined series of pressure manipulations to evaluate the operating conditions of the control valve.

The control valve is of the type having a pipe bracket portion and a service portion and an emergency portion mounted to the pipe bracket portion. The pipe bracket portion further is connected to a brake pipe, an auxiliary reservoir, an emergency reservoir, a brake cylinder retaining valve and a brake cylinder. Furthermore, a plurality of fluid passageways are provided through the pipe bracket portion such as is shown and described in application Ser. No. 08/306,790, incorporated herein by reference, for providing fluid communication from the brake pipe, the brake cylinder, the brake cylinder retaining valve, the emergency reservoir, and the auxiliary reservoir. The fluid passageways then travel through to the service portion and the emergency portion. An access port plate, as described in application Ser. No. 08/365,531, filed Dec. 28, 1994 now U.S. Pat. No. 5,451,099, and incorporated herein by reference, can also be used.

The presently described test unit directly accesses preferably all four passageways to the brake pipe, the brake cylinder, the auxiliary reservoir and the emergency reservoir, respectively. That allows an operator to directly and positively determine the various valve functions by manipulating and measuring the pressures within those channels.

A number of manual valves are utilized in the test unit to manipulate the pressure in the fluid passageways connected to the brake pipe. The valves are preferably cut-out cocks. A series of brake pipe exhaust valves are provided along the brake pipe passageway. The brake pipe exhaust valves each have varying amounts of restriction in the flow such that varying exhaust flow rates may be attained when the air is exhausted through selected ones of the exhaust valves. The term "valve" is used in its general sense and may include any means for providing a variable flow restriction to control the rate of flow therethrough.

Furthermore, the test unit preferably has a number of pressure gauges for measuring air pressure in each of the passageways. The pressure gauges and cut-out cocks are monitored and controllable by an operator as will be described more fully below. Testing could be performed using pressure transducers, solenoids and a microprocessor as described in application Ser. No. 08/396,815, incorporated herein by reference.

The test unit has means for accessing the fluid passageways that communicate to the brake pipe, the brake cylinder, the emergency reservoir and the auxiliary reservoir. The preferred means for accessing the fluid passageways is a number of access ports which a respective access port is connected to each such passageway. The access ports may be provided directly upon and through a surface of the pipe bracket portion. Alternatively, the access ports may be provided on a plate disposed between the pipe bracket portion and either the emergency portion or the service portion.

The test unit then sealably connects to the access ports, so that the various fluid passageways may be accessed by the test unit. It is preferred that the test unit be connected to the access ports through a housing and an adapter. Thus, in some embodiments, a housing connects to the access ports of the various passageways. Such housing preferably has valve means for preventing the escape of fluid pressure therefrom when the valve means is "closed".

When the fluid pressure within any or all of the passageways is to be tested, an adapter engages with the housing, "opening" the valve means and allowing the fluid under pressure to enter the adapter. Connections provided on the adapter then lend to the pressure testing device so that the fluid pressure within the passageways may be analyzed. The adapter may be provided with a cam system or other means for moving the extending members into and out of the access housing so as to move the valve means into and out of the "open" position.

It is preferred that when the fluid pressure within the passageways is not being tested, and the adapter is removed from the housing, a removable outer cover is provided as a secondary seal over the access housing to compliment the primary seal of the valve means and to prevent the entry of dirt or foreign material.

A series of tests are then conducted by an operator. The operator records the pressure measurements from the pressure gauges. The operator calculates and stores the differences between selected pairs of the pressure measurements. These pressure differences may be measured directly through the use of a differential pressure transducer, such as one provided between the auxiliary resonator pressure gauge and the brake pipe pressure gauge. First, elapsed times are measured and recorded for a predetermined amount of pressure to be reached in selected ones of the passageways beginning from a predetermined event. Furthermore, the rate of change of selected pressures in the passageways are measured and recorded. The operator then measures and records second elapsed times from a predetermined event to a change in the rate of change of selected pressures onto actual pressures in the passageways. The elapsed times are preferably measured by the operator through the use of one or more stop watches.

The pressures, the differences between selected pressures, the rates of changes of the pressures, the first elapsed times and the second elapsed times to predetermined values are then compared to evaluate the operating condition of the control valve. The results of these comparisons may be recorded.

Other objects and advantages of the invention will become apparent from a description of certain present preferred embodiments thereof shown in the drawings.

BRIEF DESCRIPTION OF THE DRAWINGS

FIG. 5 is a perspective view of a housing and adapter for connecting the test unit to the pipe bracket portion.

FIG. 6 is a cross sectional view of the housing and adapter taken along line A—A of FIG. 5.

FIG. 7 is a cross sectional view of the housing and an alternative adapter taken along line A—A of FIG. 5.

FIG. 8 is a cross sectional view of the housing and alternative adapter of FIG. 7 taken along line B—B of FIG. 5.

DETAILED DESCRIPTION OF THE PREFERRED EMBODIMENTS

Figure 1:
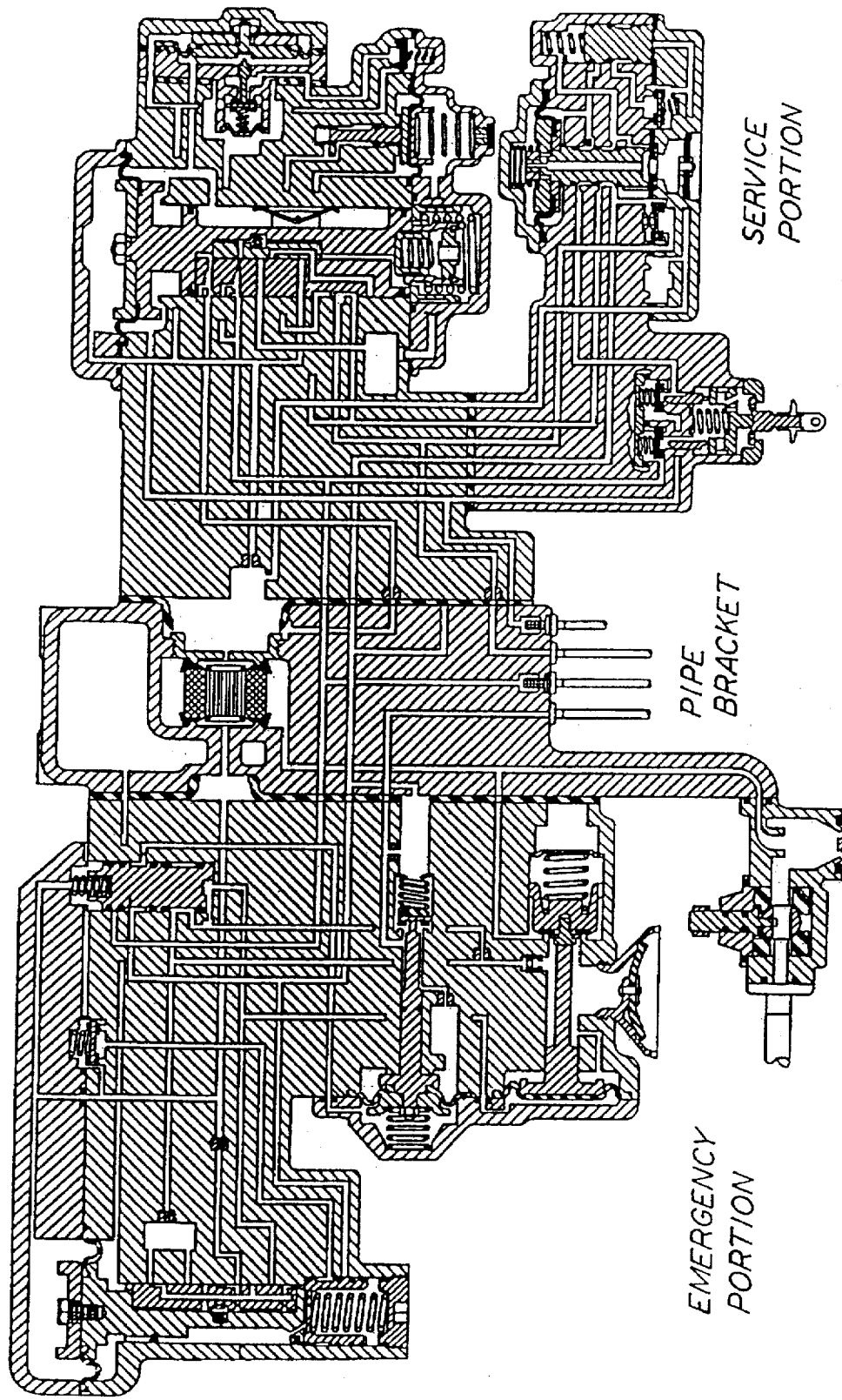
FIG. 1 is a prior art schematic of a railway freight brake control valve showing the passageways running through the pipe bracket portion, the emergency portion and the service portion.

As can be seen in prior art FIG. 1, air brake practice incorporates pipe brackets in freight brake control valves which have an emergency portion and a service portion mounted thereto. As can further be seen in FIG. 1, various fluid passageways connect the pipe bracket portion with the emergency portion and service portion, respectively. Thus, it is currently the practice in the air brake industry to provide the pipe bracket portion with a number of passageways therethrough.

Selected passageways within the pipe bracket portion open at respective access ports. The access ports may be on the pipe bracket portion directly or may be provided on a plate connected to the pipe bracket portion.

Figure 2A:
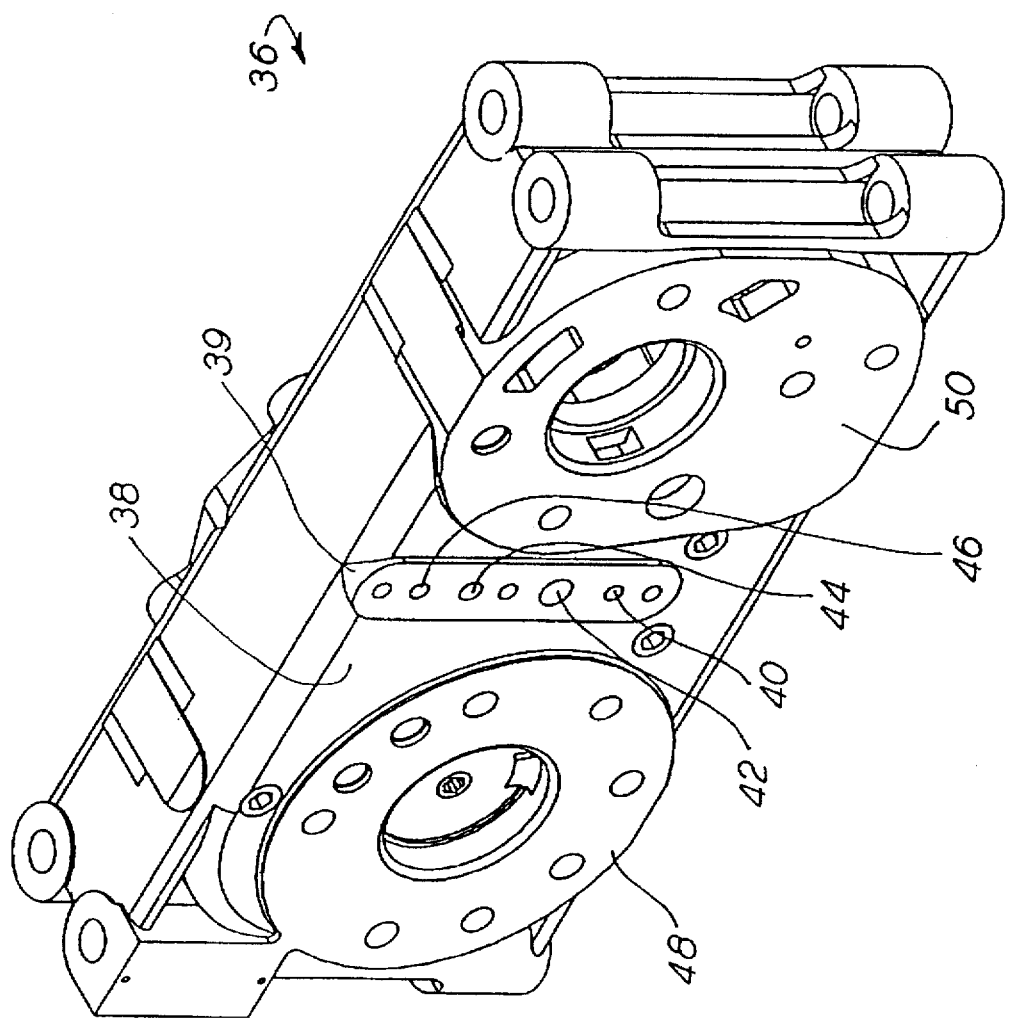
FIG. 2a is a perspective view of a pipe bracket portion having access ports provided thereon.

Referring first to FIG. 2a, the access ports are shown provided directly on the pipe bracket portion. The pipe bracket portion is preferably a single sided pipe bracket portion 36. The pipe-bracket portion 36 is called single sided because the emergency portion and service portion are mounted on the same side or face thereof. As can be seen in the figure, the service portion is mounted upon a surface 48 and the emergency portion is mounted upon a surface 50, both preferably on the same access face 38 of the single sided pipe bracket portion 36.

Provided between the service portion mounting surface 48 and emergency portion mounting surface 50, lies a boss 39. Boss 39 has four access ports 40, 42, 44, 46 provided thereon and extending into the pipe bracket portion 36. Access port 40 connects to the brake cylinder passageway, access port 42 connects to the brake pipe passageway, access port 44 connects to the auxiliary reservoir passageway and access port 46 connects to the emergency reservoir passageway (passageways not shown in FIG. 2a). Each passageway is isolated from the others so that the fluid pressure within a passageway is measurable at its respective access port. The boss 39 is preferably integral with the pipe bracket portion 36 and its surface is preferably planar. The brake cylinder passageway, the brake pipe passageway, the auxiliary reservoir passageway and the emergency reservoir passageway are each provided within the pipe bracket portion 36. The passageways and the ports to which they connect are shown and described in greater detail in co-pending application Ser. No. 08/306,790, which is incorporated herein by reference.

Figure 2B:
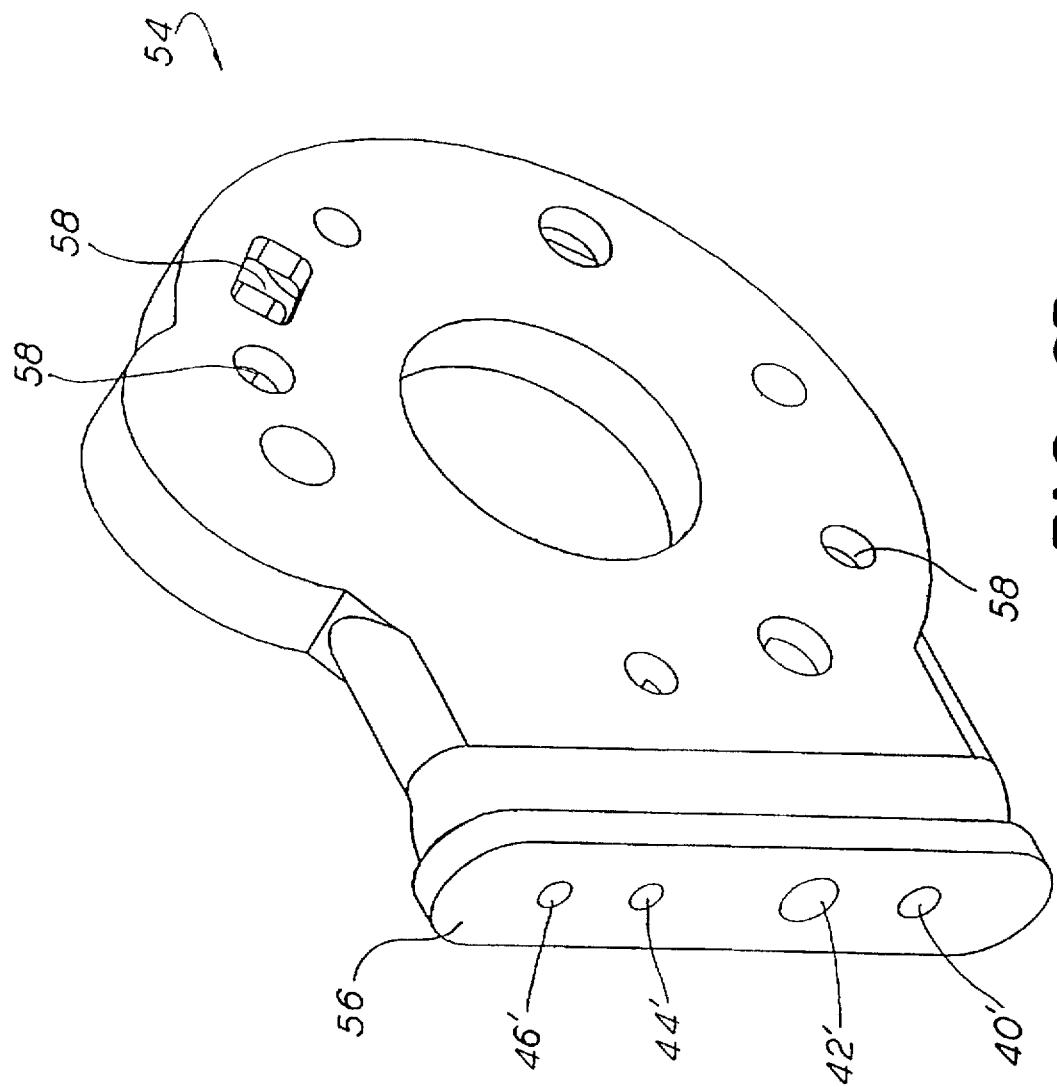
FIG. 2b is a perspective view of an access port plate.

Referring next to FIG. 2b, the access ports may be provided on a plate which is connected to the pipe bracket portion and the service portion. As is seen in prior art FIG. 1, passageways travel between the pipe bracket portion and both the emergency portion and the service portion. Therefore, at the interface between the pipe bracket portion and the service portion are openings which correspond in size and position. As a means of providing access to the fluid pressures within the passageways, an access plate 54 may be provided between the service portion and the pipe bracket portion.

Access plate 54 is provided with openings 58 on opposed sides so that each access plate opening 58 intersects a respective fluid passageway of the service control valve. Must access plate openings 58 then connects to a respective access port 40', 42', 44', 46' along a boss 56 of the access plate 54. Thus, access port 40' connects to the brake cylinder passageway, access port 42' connects to the brake pipe passageway, access port 44' connects to the auxiliary reservoir passageway and access port 46' connects to the emergency reservoir passageway (passageways not shown in FIG. 2b). Each passageway is isolated from the other so that the fluid pressure within a passageway is measurable at its respective access port. The access plate and its passageways and ports are shown and described in greater detail in application Ser. No. 08/365,531, filed Dec. 28, 1994, which is incorporated herein by reference.

Figure 3:
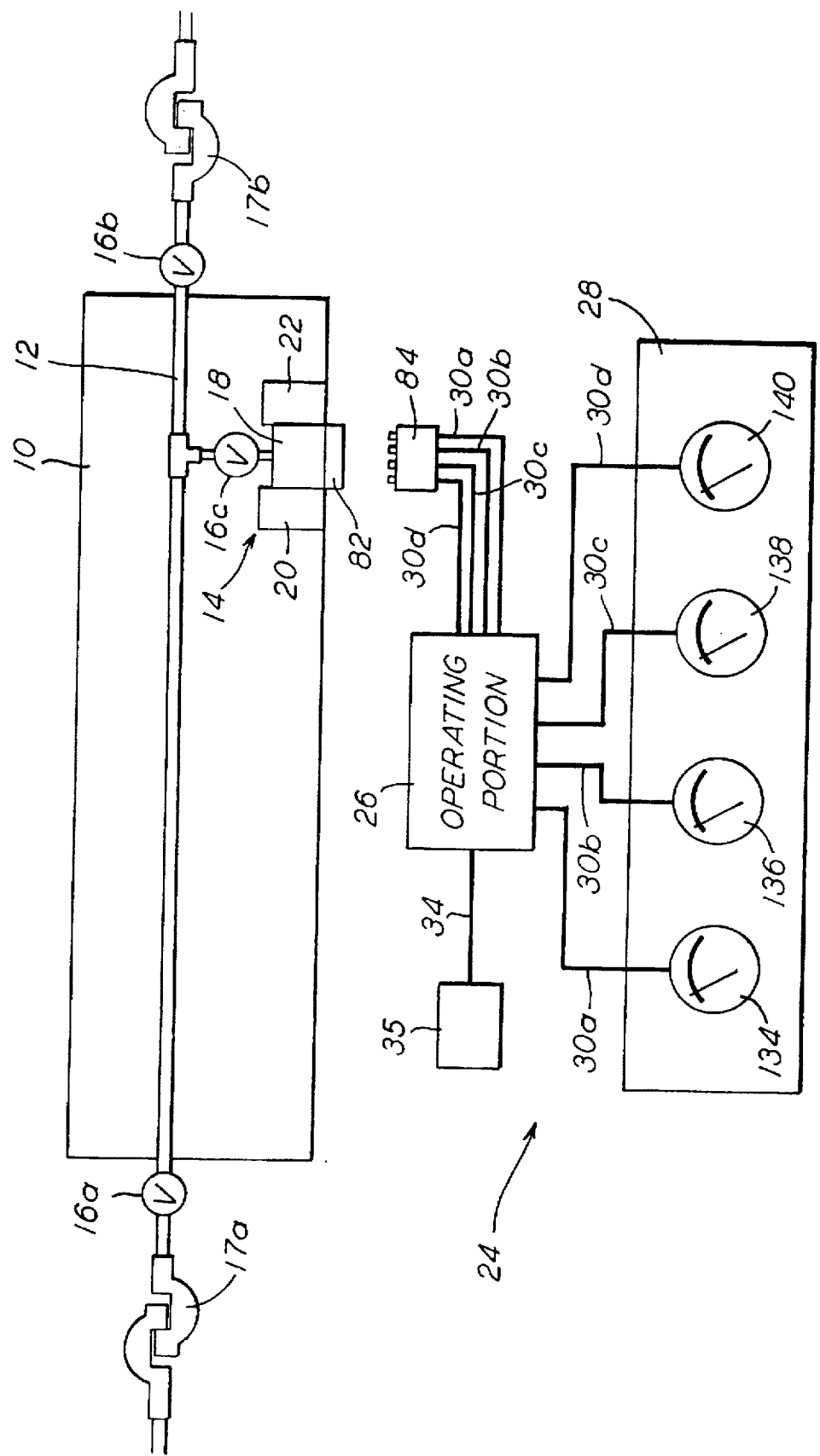
FIG. 3 is a schematic representation of the test unit connected to a railway freight brake control valve.

Referring next to FIG. 3, a schematic representation of the test unit connected to a railway freight brake control valve is shown. As can be seen in the figure, a railway freight train car 10 is depicted having a brake pipe 12 provided therewith. Cut-off valves 16a, 16b are provided along the brake pipe 12 along opposite ends of the train car 10. Cut-off valves 16a, 16b are movable through "open" and "closed" positions. When cut-off valves 16a, 16b are in an open position, fluid is able to freely travel through the cut-off valves 16a, 16b. When the cutoff valves 16a, 16b are in a closed position, fluid may not travel past cut-off valves 16a, 16b. When the cut-off valves 16a, 16b, located at opposed ends of train car 10, are both in the closed position, the section of brake pipe 12 between the cut-off valves 16a, 16b is isolated. Alternatively, blanked-off connectors 17a, 17b may be fitted on each end of the brake pipe length for the tested car. The blanked-off connectors 17a, 17b thus isolate the length of the brake pipe between the blanked-off connectors. By opening cut-off valves 16a, 16b and using blanked-off connectors 17a, 17b, the length of the brake hose and the glad hand connector seals (not shown) may be tested for leakage.

The brake pipe 12 connects to a control valve 14. A cut-off valve 16c is also provided between brake pipe 12 and control valve 14. Cut-off valve 16c is similarly moveable through "open" and "closed" positions. In this way, control valve 14 may be connected to the fluid in brake pipe 12 when cut-off off valve 16c is in a open position. Similarly, control valve 14 is isolated from the fluid in brake pipe 12 when cut-off valve 16c is in the closed position.

However, as described above, access sports 40, 42, 44, 46 are provided along control valve 14. The test device 24 is also schematically depicted in FIG. 3. The test device 24 has as its main components an operating portion 26, a display portion 28, a pressurized air source 35 and a connection means 84 for linking the device 24 to the control valve 14. It is distinctly understood that any or all of the components of the test device 24 may be separate, discrete components or may be integral with any or all of the other components.

The operating portion 26 is connected to the control valve 14. As noted above, the access ports 40, 42, 44, 46 are connected to the fluid passageways of the brake cylinder, the brake pipe, the auxiliary reservoir and the emergency reservoir, respectively. The operating portion 26 therefore has means for connecting to the access ports for accessing the fluid pressures within the various passageways of the pipe bracket portion 18.

As will be discussed more fully below, the preferred means of connecting the operating portion 26 to the access ports involve having the operating portion connected by a series of pneumatic hoses 30a, 30b, 30c, 30d to an adapter 84. The adapter 84 is then engageable with an access housing 82. The access housing 82 is mounted upon and engages the access ports. Thus, the fluid pressure of the brake cylinder passageway travels through access port 40 and through hose 30a into the operating portion 26. The fluid pressure of the brake pipe passageway travels through access port 42 and through hose 30b into the operating portion 26. The fluid pressure of the auxiliary reservoir passageway travels through access port 44 through hose 30c into the operating portion 26. The fluid pressure of the emergency reservoir passageway travels through access port 46, through hose 30d into the operating portion 26. An air supply hose 34 connects a source of compressed air 35 to the operating portion 26. A pressure gauge 33 measures the pressure delivered to supply hose 34 by compressed air source 35.

Figure 4:
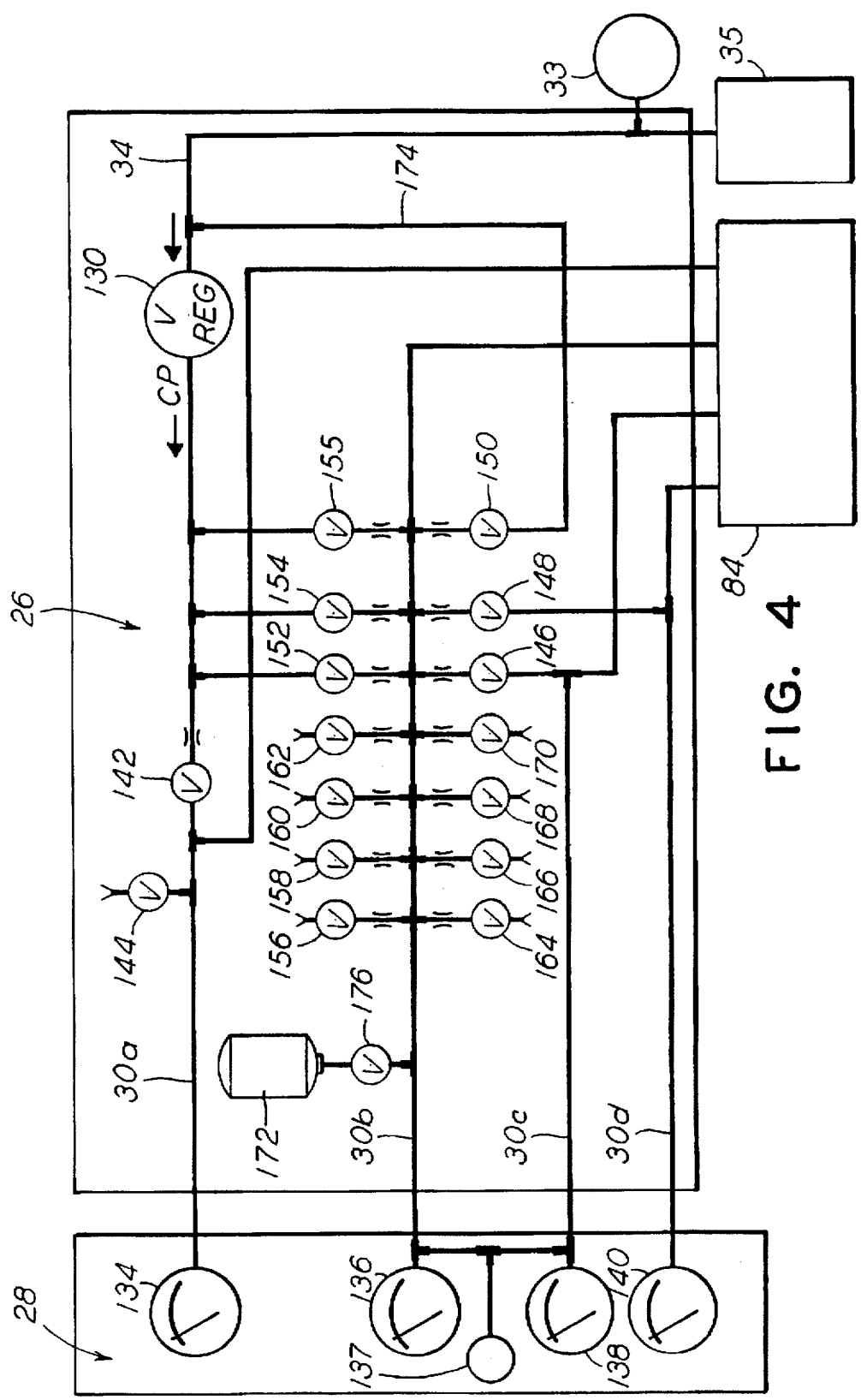
FIG. 4 is a schematic representation of the operating portion of the test unit shown operatively connected to other portions of the test unit.

The operation of the test device 24 is depicted schematically in more detail in FIG. 4. Compressed air travels from a compressed air source 35 through air supply pneumatic hose section 34. From the air supply hose 34 the compressed air flows through a pressure regulator 130. Unregulated air pneumatic hose section 174 has a valve 150 provided thereon such that when valve 150 is closed, the compressed air from the air supply pneumatic hose 34 travels solely through the pressure regulator 130. When valve 150 is opened, unregulated compressed air may flow into the brake pipe pneumatic hose 30b.

The regulated compressed air from the pressure regulator 130 may travel through the brake cylinder pneumatic hose 30a and into the brake cylinder (not shown in FIG. 4) when the brake cylinder charge valve 142 is open and the brake cylinder exhaust valve 144 is closed. When brake cylinder charge valve 142 is closed and the brake cylinder exhaust valve 144 is closed, compressed air may no longer flow into the brake cylinder, and further, compressed air already present in the brake cylinder is retained there if the control valve is in applied position or in release and retainer is set to high pressure position. Compressed air may exhaust the brake cylinder through brake cylinder exhaust valve 144 by operating the brake cylinder exhaust valve 144.

Regulated air from the pressure regulator 130 may also flow through any one of three parallel paths to the brake pipe pneumatic hose 30b. Each path from the pressure regulator to the brake pipe pneumatic hose 30b has a respective valve 152, 154, 155 provided thereon. The regulated air may flow substantially unrestricted to the brake pipe pneumatic hose 30b when the brake pipe valve 152 is open. The regulated air may also pass with some flow restriction through second brake pipe valve 154 into the brake pipe pneumatic hose 30b when the brake pipe valve 154 is open. Also, the regulated air may travel through a flowmeter and valve 155 into the brake pipe pneumatic hose 30b when flow meter and valve 155 is open. Of course, valves 152, 154, 155 may also all be placed in a closed position in which no fluid may pass therethrough.

The brake cylinder pneumatic hose 30a, the brake pipe pneumatic hose 30b, the auxiliary reservoir pneumatic hose 30c and the emergency reservoir pneumatic hose 30d are each connected to a respective pressure gauge 134, 136, 138, 140. Thus, the fluid pressure within the brake cylinder, the brake pipe, the auxiliary reservoir and the emergency reservoir may be measured.

The auxiliary reservoir pneumatic hose 30c is connected to the brake pipe pneumatic hose 30b through a valve 146. Valve 146 connects brake pipe to the auxiliary across the service valve diaphragm. Similarly, the emergency reservoir pneumatic hose 30d is connected to the brake pipe pneumatic hose 30b through a valve 148. Thus, fluid communication is made between the auxiliary reservoir pneumatic hose 30c and the brake pipe pneumatic hose 30b and between the emergency reservoir pneumatic hose 30d and the brake pipe pneumatic hose 30b when valves 146, 148, respectively, are open.

A series of brake pipe exhaust valves 156, 158, 160, 162, 164, 166, 168, 170 are provided along the brake pipe pneumatic hose 30b. The brake pipe exhaust valves 156–170 each have varying amounts of restriction in the flow such that varying exhaust flow rates may be attained when the air is exhausted through selected ones of the exhaust valves. Although eight exhaust valves 156, 158, 160, 162, 164, 166, 168, 170 are shown, any number of exhaust valves may be utilized. A buffer reservoir 172 is connected to the brake pipe pneumatic hose 30b to provide a volume of air at which the pressure gauge 136 may accurately measure the pressure and is separated by valve 176 from hose 30b.

The operating portion 26 is then connected to a display portion 28. The portion 28 is the visual display output from the pressure gauges 134, 136, 138, 140. The display for each pressure gauge may be a dial or a digital display. In addition, a differential transducer 137 may be provided between the auxiliary reservoir pressure gauge 138 and the brake pipe pressure gauge 136. Although not shown in the figures, differential transducers may be provided between any two pressure gauges.

An operator calculates and records the values of and the differences between selected pairs of pressures of selected access ports taken from pressure gauges 134, 136, 138, 140 and flowmeter 155. First elapsed times are also measured and recorded by the operator for a predetermined amount of pressure to be reached in selected ones of the passageways connected to its access port, beginning from a predetermined event. The rate of change of selected pressures in the various passageways are measured and stored as well. A timer may be built into the tester or used separately to measure the rates of pressure change. The operator then measures and stores second elapsed times from a predetermined event to a change in the rate of change of selected pressures in the various passageways. The pressures, the differences between selected pressures, the rate of changes of the pressures, the first elapsed times, the second elapsed times and the flow readings are then compared by the operator to evaluate the operating condition of the control valve 14. Finally, the results of these comparisons are recorded.

The operation of the device 24 and particularly the operating portion 26 will now be described in greater detail with reference to particular test procedures:

CHARGING THE CAR

In the prior art valve testing, the control valve distributes air to the auxiliary reservoir, the emergency reservoir and the quick action reservoir during charging. During charging of the car, the regulated air introduced through the brake pipe builds pressure, but temperature effects swing the pressure below that target pressure. An operator must wait for the system air to equalize and must keep trying to reach the target pressure, dealing with temperature-caused pressure swings. First, pressure is built up in the brake pipe, then the control valve feeds the pressure into the auxiliary reservoir and emergency reservoir. This takes a long time since the pressurized air must travel through the control valve including a number of very small chokes.

Referring to FIG. 4, for charging with the preferred test unit, the compressed air travels through the air supply pneumatic hose 34 and flows to the brake pipe pneumatic hose 30b. To get up to target pressure, valves 146, 148, 150 are opened. Unregulated air is introduced into the brake pipe pneumatic hose 30b through valve 150. The unregulated air then flows into the auxiliary reservoir pneumatic hose 30c and the emergency reservoir pneumatic hose 30d through valves 146, 148, respectively. Valve 150 is then closed and regulated air through valve 152 takes the brake pipe pressure, auxiliary pressure and emergency pressure to target. Thus, the device utilizes a two pressure air feed supply, one of which is regulated air and the other of which is unregulated air.

With valve/flowmeter 155, open, the flowmeter 155 verifies the flow to the brake pipe pneumatic hose 30b because the air flow through the flowmeter 155 and through valve 152 have parallel paths. Thus, one can interpret what the air flow is through valve 152 by examining the air flow through the flowmeter 155. Then, valve 152 is closed so that the air flow must go through the flowmeter and valve 155 and the air flow into brake pipe hose 30b can be verified.

There is also preferred a reservoir 172 shown along the brake pipe pneumatic hose 30b that is part of the test equipment and is connected to the brake pipe pneumatic hose 30b by valve 176. The reservoir is useful because when a very rapid pull of air flows through the brake pipe pneumatic hose 30b, a gauge placed in that hose cannot provide an accurate reading of the pipe bracket pressure. The reservoir 172 acts as a buffer. Thus, there is a volume of air provided which can be monitored to determine what pressure changes are happening in that brake pipe pneumatic hose 30b.

RETAINER VALVE

For testing the retainer valve in the prior art, a visual check is performed. The retainer valve is put in an actuated position of high pressure retaining, the control valve is moved to release and the brake cylinder pressure will gradually drop. Eventually the gradual drop in the brake cylinder pressure will stop and the brake cylinder is checked to make sure the brake cylinder has not retracted within a certain amount of time. A potential drawback associated with the prior art test is that the brake cylinder pressure could drop to a small amount—such as 3 psi—and the cylinder will still appear to be actuated despite not having sufficient pressure to fully actuate.

In the preferred test procedure utilizing the test unit, the brake cylinder exhaust valve 144 is closed, the retainer valve (not shown) is turned to high pressure position retaining, then the brake cylinder charge valve 142 is opened which allows regulated air to be introduced into the brake cylinder. The brake cylinder is charged to a pressure level below the set point (i.e., the level of brake cylinder pressure at which the check valve shuts off). Then, the brake cylinder pressure is monitored at pressure gauge 134 (i.e., the pressure valve is measured at different times) to determine whether there is any decrease in the brake cylinder pressure. Lack of decrease in the brake cylinder pressure beyond some preselected amount indicates that the retainer valve is working. Thus, the pressure is monitored to determine how much the brake cylinder pressure drops rather than looking at the brake cylinder. Then, the retainer valve is put in the direct exhaust position and the brake cylinder pressure is monitored at pressure gauge 134 to ensure that the brake cylinder pressure decreases a predetermined amount within a predetermined time period.

Furthermore, instead of waiting for the brake cylinder to reach its operating pressure through air delivered from the service portion after it has been applied and then released (as is done in the prior art testing procedures), a retainer test can be instituted with a valve in release without previously having to have applied it. Air flowing into brake cylinder and thereby to the retainer may be charged directly to valve 142 to under the set point of the retaining check valve. Then it can be determined whether the valve shuts off. This saves time in charging the brake cylinder, air can be applied directly to the brake cylinder, treating the control valve as if it is just in release or charging position. To save time, the car charging and retainer valve tests can be done simultaneously.

SLACK ADJUSTER

Regarding slack adjuster tests, the prior art requires that the control valve be applied and released. This takes a long time due to charging.

With the presently preferred test unit, after applying the control valve with a minimum reduction, the remaining brake cylinder cycling can be done directly. The brake cylinder charge valve 142 allows direct charging of regulated air from the regulator 130 to the brake cylinder. The brake cylinder exhaust valve 144 allows for direct exhausting of air from the brake cylinder. The brake cylinder pressure may be increased directly through the brake cylinder charge valve 142, then the brake cylinder exhaust valve 144 is actuated to directly release that pressure. The brake cylinder charge valve 142 and the brake cylinder exhaust valve 144 perform faster exhaust and charge functions than the control valve, allowing direct manipulation of the brake cylinder.

QUICK SERVICE LIMITING VALVE

To test the limiting valve with the presently preferred test unit, while the limiting valve is applied, the pressure is maintained so that the auxiliary reservoir/brake pipe valve 146 is opened. That places the service portion in the service lap position. Direct manipulation of the brake cylinder is possible by dropping pressure without the Service portion going to application to compensate for it. Connecting the auxiliary reservoir pneumatic hose 30c to the brake pipe pneumatic hose 30b makes the test very stable and allows manipulation of either valve 152 or valve 154 to hold the brake pipe pressure while the brake cylinder is applied.

In the prior art AB rack test, the limiting value is applied and the brake cylinder pressure is dropped to zero and checked to see whether the brake cylinder pressure builds up again. The technique employed with the presently preferred test unit is very similar. The limiting valve is applied and then the service portion is stalled (i.e., the auxiliary reservoir is connected to the brake pipe so that the slide valve is lapped off). Then, the air pressure in the brake cylinder is dropped through the brake cylinder exhaust valve 144 to around 0 psi for a period of approximately five seconds. Then the brake cylinder exhaust valve 144 is closed and the brake cylinder pressure is monitored to ensure that it increases.

EMERGENCY TEST

In the prior art test of emergency application, it is indirectly determined that the air pressure from the emergency reservoir went into brake cylinder and the auxiliary reservoir. Pressures are not known, but a noise is generated when the vent valve piston is actuated once brake pipe pressure is exhausted through the vent valve port. The noise indicates that one part of the valve is working but it does not positively indicate that the entire valve is working. It remains unknown whether the high pressure spool has moved to connect the emergency reservoir to the auxiliary and brake cylinder. Although air from the auxiliary reservoir may have entered the brake cylinder such that brake cylinder pressure and auxiliary pressure equalize, the emergency reservoir air may not have entered into the brake cylinder and auxiliary reservoir, such that the full effect of emergency has not been achieved. Also, the separate (stand alone) vent valve must be disabled physically for this test.

In contrast, the preferred automatic test unit allows direct checking of the pressures at the brake cylinder, auxiliary reservoir and emergency reservoir through pressure gauges 134, 138, 140. The brake cylinder pressure, the auxiliary reservoir pressure and the emergency reservoir pressure are monitored and should be approximately equal during an emergency application indicating that the auxiliary reservoir, the emergency reservoir and the brake cylinder are in fluid communication. Furthermore, the separate vent valve is not involved in the test and, therefore, does need disabling because using the volume 172 and disconnecting 12, the test can isolate the control valve alone.

EMERGENCY APPLICATION

The prior art tested the control valve with the brake line 12 connected and two effective restricted rates for all volumes of brake pipe contained in brake line 12.

The present test device closes valve 16c so that every car will be tested to a uniform volume and rate. The uniform approach standardizes the test for all cars so that some are not tested more strictly or leniently depending on volume and rate combination.

RELEASE TEST AFTER EMERGENCY

Following an emergency application in the prior art testing procedure, there is a delay for a time period of 75 to 90 seconds from the start of the emergency application before one can recharge due to quick action air draining through a relatively small orifice. To cause a release after emergency, the prior art charges brake pipe through a restriction until 28 psi is reached. The charge path is closed and the brake pipe pressure is then monitored to determine whether brake pipe pressure increases, indicating proper performance.

With the present test unit, it is not necessary to wait for 90 seconds to recharge. An emergency accelerated release of the brake pipe means that the emergency portion has caused brake cylinder pressure to go into brake pipe which provides a very rapid build up of brake pipe pressure. The test unit allows an emergency accelerated release to be achieved without having to wait the built-in time associated with an emergency application of 75–90 seconds.

With the present test unit, brake pipe pressure is reduced to zero psi without creating an emergency application. This makes the service portion and emergency portion respond as if each were in the final stage of an emergency application. The routine of charging to 28 psi and checking for increase can be done immediately without the long delay time.

MANUAL RELEASE VALVE

The prior art manual release valve test procedure requires the operator to pull a release handle after an emergency application to see that the brake cylinder retracts. Then the control valve is recharged and reapplied to check that the release valve has reset. This recharge is time consuming. If air pressure is lost through the actuation of the release valve, then the valve must be reset to ensure proper operation.

The new testing unit also requires the operator to pull the release handle after an emergency application to see that the brake cylinders retract. After the handle has released, the new testing unit involves an operator checking to ensure that the auxiliary reservoir and emergency reservoir pressures stop dropping. This verifies that the check valves in the release valve portion have reseated and are not leaking. However, during the reset of the release valve portion test, the new testing unit does not have to charge the car as fully before reapplying the valve. The new testing unit charges brake pipe and looks for emergency pressure to increase indicating that the service portion has moved to release, i.e., charging. This then allows the valve to be applied instead of waiting for the whole system to be charged to 90 psi, thereby saving time charging.

SERVICE RELEASE TEST

Under the prior art test unit, the brakes are applied, then air is supplied to the brake pipe hose through a small orifice. The brake cylinder must suddenly decrease as indicated by a blow of the retainer within a specified time based on length of car. This has a loose relationship to release differential required to release the valve. Currently, there are no minimum times (or too low a release indication too sensitive a valve).

Under the presently preferred test unit, the brakes are applied, then air is supplied to the brake pipe pneumatic hose 30b through valve 154 which has a very small orifice. The brake pipe pressure is built up slowly and controlled due to the use of volume 172 and the isolation of 12, and the release differential (the differential between the brake pipe pressure versus the auxiliary reservoir pressure) is monitored until a release occurs, then brake cylinder pressure will drop very rapidly. The maximum value of the release differential is monitored and tells that the valve is not too sensitive nor too insensitive.

PISTON TRAVEL

Under the prior art test unit, the initial brake cylinder piston travel is measured after making a 30 psi reduction. This procedure gets approximately 50 psi in the brake cylinder line.

The present preferred test unit will apply the control valve with a minimum application and then directly charge the brake cylinder through brake cylinder charge valve 142 to obtain 50 psi so that measurements can be more precise.

APPLIED LEAKAGE TEST

The prior art test unit applies the control valve with a 10 psi reduction using a relieving regulator set 10 psi below fully charge pressure. After the reduction is complete, the flowmeter 155 must not increase from release test by more than 50 in³/min into brake pipe. The prior art could not determine leakage from auxiliary to emergency as could occur with a faulty reservoir dividing plate.

The present preferred unit applies the valve and maintains the 10 psi reduction. During the maintaining period, brake pipe flow as well as auxiliary, brake cylinder and emergency pressures are monitored for changes to indicate leakage into or out of each separate air system. This directly indicates what leakage is present and in what system.

SEPARATE (STAND ALONE) VENT VALVE TEST

The prior art test unit uses the same orifice to test whether the vent valve goes to emergency and to test whether the emergency portion goes to emergency. The test is performed with the control valve cutout and only brake pipe 12 with the vent valve active.

The present preferred test unit uses different orifices (exhaust valves 156, 158, 160, 162, 164, 166, 168, 170) and thereby different rates of exhaust to check the vent valve and control valve operation as a result of an emergency application. The vent valve should go to emergency at a rate slower than an emergency portion. Thereby, the present preferred test device tests each with appropriate rates. The emergency portion is disabled from going to emergency by closing the cutout valve 16c and draining the brake pipe pressure at the test unit and the control valve pressure drops to approximately zero. Then, the operator opens the cutout valve 16c. When the test unit senses the build-up of brake pipe pressure coming from the main brake pipe line 12 through the cutout valve 16c, the operator releases stored air in the reservoir 172 that had been previously charged and closed off before the control valve brake pipe went to zero. This releasing of air from reservoir 172 prevents the vent valve from detecting a large pressure drop, it also doesn't allow the quick access chamber pressure to build-up in the emergency portion thereby nullifying the emergency portion from a go test on the vent valve.

Means for controlling the test unit to the control valve are provided. One such setup is shown and described below with reference to FIGS. 5 through 8. However, a preferred means for connecting the test unit to the control valve is shown and described in application Ser. No. 08/427,358, filed Apr. 25, 1995, incorporated herein by reference.

Referring next to FIGS. 5 and 6, an access housing 82 and adapter 84 are shown which may connect to the access ports. The access housing 82 has channels 92, 94, 96, 98 for communicating with the respective passageways 36, 38, 40, 42. The housing channels 92, 94, 96, 98 have opposed ends, with one end of each channel 92, 94, 96, 98 being bordered by an access end 102. Each access end 102 of the access channels 92, 94, 96, 98 being sized and configured to connect to and sealably engage with the respective access port. The end of each of the housing channels opposite to each access end 102 have a receiving chamber 104. The housing channels 92, 94, 96, 98 are preferably positioned in-the access housing 82 such that the access ends 102 of each of the housing channels 92, 94, 96, 98 correspond in location to the respective access ports 28, 30, 32, 34 of the passageways.

Intermediate the receiving chamber 104 and the access end 102 of each housing channel 92, 94, 96, 98, preferably at a shouldered end of the receiving chamber 104, is a valve seat 106. Access housing 82 preferably has a valve means provided therein. Preferably, a number of valve means are provided within the access housing 82, such that a respective valve means is provided within each of the housing channels 92, 94, 96, 98. Each such valve means is preferably comprised of a spring 108 seated within the housing channel and a stopper 110 engageable with the spring 108, which together operate in cooperation with the valve seat 106. The stoppers 110 are each movable within their respective housing channel 92, 94, 96, 98 and are biased by the springs 108 into contact with the valve seats 106. With stoppers 110 in bias contact with the respective valve seats 106, the valve means is said to be in the closed position, in which fluid from the access ports 28, 30, 32, 34 cannot pass through valve seats 106 into the receiving chambers 104 of each housing channel 92, 94, 96, 98. Thus, when the valve means is in the closed position, no fluid pressure is lost through the access housing 82. The housing may be secured to the access plate by any convenient means, such as by studs.

As can be seen in FIGS. 5 and 6, an adapter 84 may be attached to access housing 82 when it is desired to access the fluid pressures of the various passageways 36, 38, 40, 42, which represent respectively the fluid pressures in the brake cylinder, the brake pipe, the auxiliary reservoir and the emergency reservoir. The adapter 84 is connected to the access housing 82 by any convenient means such as by studs 126. Adapter 84 has channels 112, 114, 116, 118 provided therethrough. The adapter channels are each bounded at one end by a respective extending member 120, which extends outward from one end of the adapter 84. At an opposite end of the adapter channels 112, 114, 116, 118, the adapter channels are each bounded by a respective fitting 122, which extends outward from the adapter 84. Adapter channels 112, 114, 116, 118 are positioned along adapter 84 such that when the adapter 84 is placed adjacent the access housing 82, each adapter channel 112, 114, 116, 118 corresponds in position and location with each respective housing channel 92, 94, 96, 98. Each of the adapter extending members 120 are sized and configured to-fit inside and sealable engage with each respective receiving chamber 104 of the access housing channels 92, 94, 96, 98.

When each adapter extending member 120 is inserted within its respective receiving chamber 104 of the access housing channels 92, 94, 96, 98, each extending member 120 contacts a respective valve means stopper 110. As the extending members 120 are inserted fully within each receiving chamber 104, the extending members 120 push each valve means stopper 110 overcoming the spring bias against stopper 110 and moving the stopper 110 back away from its respective valve seat 106 into an "open" position. The extending members 120 are sized and configured so that when they are inserted within the receiving chambers 104, fluid may travel around the extending members 120 and into the respective housing channels 92, 94, 96, 98. When the valve means stopper 110 is in the open position, fluid pressure may travel from the access plate passageways 36, 38, 40, 42, through the respective access ports 28, 30, 32, 34, through the respective housing channels 92, 94, 96, 98 and the respective adapter channels 112, 114, 116, 118 and out of the adapter fittings 122 where the fluid pressure may be an analyzed.

When the adapter 84 is separated from the access housing 82 such that each extending member 120 of the adapter 84 is removed from its corresponding receiving chamber 104 of the access housing 82, the springs 108 will force the stoppers 110 against their respective valve seats 106, causing the valve means to return to the closed position. Thus, when the adapter 84 is removed from engagement with the access housing 82, fluid pressure is maintained within the access housing 82.

Referring next to FIGS. 5, 7 and 8, a modified adapter 184 may be attached to access housing 82 as a means of accessing the fluid pressures of the various access plate passageways 36, 38, 40, 42. With respect to the following description of adapter 184, the access housing 82 operates in identical fashion as was described with respect to FIGS. 5 and 6.

The adapter 184 is affixed to the access housing 82 by any convenient means such as by studs 126. Adapter 184 has channels 186, 188, 190, 192 provided therethrough. The adapter channels 186, 188, 190, 192 are each bounded at one end by a respective fitting 194, which extends outward from the adapter 184. An opposite end of each adapter channel 186, 188, 190, 192 is connected to a transverse cam shaft bore 196. Provided within the cam shaft bore 196 is a cam shaft 198 having a number of eccentric portions 200. Each eccentric portion 200 is coupled to a respective extending member 202. The respective extending members 202 extend outward from an end of the respective adapter channel opposite to the end bounded by the fitting 194.

The adapter channels 186, 188, 190, 192 are positioned along adapter 184 such that when the adapter 184 is placed adjacent the access housing 82, each adapter channel 186, 188, 190, 192 corresponds in position and location with each respective housing channel 92, 94, 96, 98. Each of the adapter extending members 202 are sized and configured to fit inside and sealably engage with each respective receiving chamber 104 of the access housing channels 92, 94, 96, 98. When adapter 184 is so positioned adjacent the access housing 82 and is affixed thereto such as by studs 126, the extending members 202 of adapter 184 extend within receiving chambers 104 but do not contact valve means stopper 110 or, in the alternative, do not sufficiently contact valve means stopper 110 to move valve means stopper 110 overcoming the spring bias provided by spring 108 (not shown in FIGS. 7 and. 8).

Once the adapter 184 is secured to access housing 82 so that there is a seal between each respective adapter channel 186, 188, 190, 192 and its respective access housing channel 92, 94, 96, 98, the cam shaft 198 is engaged. A cam handle 204 is provided which is connected to cam shaft 198. Thus, when handle 204 is rotated, cam shaft 198 is rotated as well within cam shaft bore 196. As cam shaft 198 is rotated, cam shaft eccentric portions 200 are moved in a circular path. As the handle 204 is rotated forward, the cam shaft eccentric portions 200 are rotated towards the access housing 82 causing extending members 202 to be moved further into the access housing 82. When the handle 204 is moved sufficiently, the extending members 202 are inserted fully within each receiving chamber 104, and the extending members 202 push each valve means stopper 110, overcoming the spring bias against stopper 110 and moving the stopper 110 back away from its respective valve seat 106 into an "open" position. The handle 204 is then locked into an open position while testing of the fluid pressures is conducted.

Once it is desired to disconnect the adapter 184 from the access housing 82, the handle 204 is moved away from the access housing 82 moving the extending members 202 away from and out of each respective receiving chamber 104 so that the valve means stopper 110 is once again biased by the springs against their respective valve seats 106 causing the valve means to return to its "closed" position.

Variations of the shown embodiments are also possible. Thus, while certain present preferred embodiments have been shown and described, it is distinctly understood that the invention is not limited thereto but may be otherwise embodied within the scope of the following claims.

We claim:

1. A portable, single-car test unit for executing a series of pressure manipulations to evaluate the operating conditions of a railway freight brake control valve, said control valve being of the type having a pipe bracket portion, with a service portion and an emergency portion mounted thereto, said pipe bracket portion further being connected to a brake pipe, an auxiliary reservoir, an emergency reservoir and a brake cylinder, wherein a plurality of passageways are provided to said control valve for providing fluid communication from such brake pipe, such brake cylinder, such emergency reservoir and such auxiliary reservoir to respective ones of said service portion and said emergency portion, and wherein ports are provided for accessing such passageways, said test unit comprising:

a pneumatic pressurized air supply;

valve means for charging and discharging pressurized air in said passageways and for selectively allowing fluid communication between selected ones of such passageways;

a connection attachable to said ports for accessing said passageways, said connection sealably linking said passageway access means with said test unit; and means for measuring air pressure representative of the pressure in each of said passageways.

2. The test unit of claim 1 wherein said connection attachable to said access ports comprises:

(a) a housing having at least one channel extending therethrough, each such at least one housing channel being bounded at one end by a housing channel access end and each such at least one channel being bounded at an opposite end by a receiving chamber, wherein each said channel access end being sized and configured to sealably engage with a respective one of said access ports, said housing further having valve means, movable to a closed position in which fluid pressures are contained within each said channel of said housing, and an open position in which fluid pressure may exit said housing channels; and (b) an adapter having a selected number of channels extending therethrough, each such adapter channel being bounded at an end that sealably engages said access housing by a respective extending member and an opposite end of each such adapter channel being connectable to fluid pressure analyzing means, wherein said extending members enter a respective access housing receiving chamber, moving said valve means to said open position.

3. The test unit of claim 1 further comprising a pressure regulator operatively connected to said air supply and wherein car charging is performed by opening valves connected to said air supply and to at least one of said passageways, and wherein air from said air supply may be directly input to at least one of said passageways.

4. The test unit of claim 3 further comprising a flowmeter provided between the air supply and the valves, and wherein once a selected amount of unregulated air has entered the passageways, regulated air from the air supply may be input to at least one of said passageways while being monitored by said flowmeter.

5. The test unit of claim 1 wherein retainer valve operation is verified by opening a valve operatively connected to such brake cylinder passageway such that fluid pressure in such brake cylinder passageway is increased to a selected level, and wherein said valve is then closed and fluid pressure within such brake cylinder passageway is measured over selected time intervals to determine a rate of pressure drop in such brake cylinder passageway.

6. The test unit of claim 1 wherein slack adjustment operation is verified by manipulation of the brake cylinder through an exhaust valve connecting with such brake cylinder passageway which opens to ambient, and a valve provided with such brake cylinder passageway connecting to said air supply.

7. The test unit of claim 1 wherein emergency application of the control valve is verified by making an emergency application to the control valve and measuring and comparing pressures representative of the pressure in such brake cylinder passageway, such auxiliary reservoir passageway and such emergency reservoir passageway.

8. The test unit of claim 1 wherein manual release valve operation is verified by making an emergency application to such control valve and actuating a release handle to release such brake cylinder, and wherein the pressures in such auxiliary reservoir passageway and such emergency reservoir passageway are measured over selected time intervals to detect pressure drops.

9. A method for executing a series of pressure manipulations to evaluate the operating conditions of a railway freight brake control valve, said control valve being of the type having a pipe bracket portion, with a service portion and an emergency portion mounted thereto, said pipe bracket portion further being connected to a brake pipe, an auxiliary reservoir, an emergency reservoir and a brake cylinder, wherein a plurality of passageways are provided to said control valve for providing fluid communication from such brake pipe, such brake cylinder, such emergency reservoir, and such auxiliary reservoir to respective ones of said service portion and said emergency portion, said method comprising the steps of:

accessing said passageway communicating to such brake pipe, and said passageways communicating to at least one of such brake cylinder, such emergency reservoir and such auxiliary reservoir;

providing a pneumatic pressurized air supply;

selectively charging from said pressurized air supply and discharging pressurized air in such passageways and selectively providing fluid communication between selected ones of such passageways;

sealably linking such passageways with said test unit;

measuring and storing air pressure in selected ones of said passageways;

calculating and recording differences between selected pairs of said measured air pressure;

measuring and recording first elapsed times for a predetermined valve of pressure to be reached in selected ones of such passageways beginning from a predetermined event;

measuring and recording the rate of change of selected pressures in such passageways; and measuring and recording second elapsed times from a predetermined event to a change in the rate of change of selected pressures in such passageways.

10. The method of claim 9 further comprising operatively connecting a pressure regulator to the air supply and charging selected ones of such passageways by opening valves connected to said air supply and to at least one of said passageways, and directly inputting air from said air supply to at least one of such passageways.

11. The method of claim 10 further comprising providing a flowmeter between said air supply and said valves, and inputting regulated air from said air supply to at least one of such passageways while being monitored by said flowmeter once a selected amount of unregulated air has entered such passageways.

12. The test unit of claim 9 wherein retainer valve operation is verified by opening a valve operatively connected to such brake cylinder passageway such that fluid pressure in such brake cylinder passageway is increased to a selected level, and then closing said valve and measuring the pressure within such brake cylinder passageway over selected time intervals to determine a rate of pressure drop in such brake cylinder passageway.

13. The method of claim 9 wherein slack adjustment operation is verified by manipulating such brake cylinder through an exhaust valve connecting with such brake cylinder passageway which opens to ambient and a valve provided with such brake cylinder passageway between such brake cylinder and said air supply.

14. The method of claim 9 wherein emergency application of such control valve is verified by making an emergency application to such control valve and measuring and comparing pressures representative of the pressure in such brake cylinder passageway, such auxiliary reservoir passageway and such emergency reservoir passageway.

15. The method of claim 9 wherein manual release valve operation is verified by making an emergency application to such control valve and actuating a release handle to release such brake cylinder, and wherein the pressures in such auxiliary reservoir passageway and such emergency reservoir passageway are measured over selected time intervals to detect pressure drops.

* * * * *